March 1, 1966  GÖTE ESKIL YNGVE HOLMBERG  3,237,263

MEANS FOR FASTENING A STRAP

Filed March 27, 1963

INVENTOR.
Göte Eskil Yngve Holmberg
BY Karl W. Flocks
Attorney 3,237,263
MEANS FOR FASTENING A STRAP
Göte Eskil Yngve Holmberg, Anderstorp, Sweden, assignor to G.E.Y.-Patenter Aktiebolag, Anderstorp, Sweden, a corporation of Sweden
Filed Mar. 27, 1963, Ser. No. 268,383
Claims priority, application Sweden, Mar. 27, 1962, 3,380/62
5 Claims. (Cl. 24—196)

The present invention relates to straps, particularly in safety seat belts, with a fastening for the strap comprising a frame, for example a buckle, a locking tongue or an anchoring means or fitting, with a slideable bar which is non-rotatably guided in the frame for movement in its transverse direction towards and away from a stationary bar mounted in said frame and extending along the slidable bar, the strap passed around the slidable bar being drawn between the slidable bar and the stationary bar in order, upon movement of the slidable bar towards the stationary bar, to be pressed against said stationary bar in an engagement preventing withdrawal of the strap from said fastening.

In such a fastening the strap may "creep" in that it is pushed up into a loop when the strap is moved towards the fastening (which may occur in a safety seat belt for instance when the belt is unstrapped after use) and then the strap may be fixed in a new position in the fastening when a pull is again exerted at the strap. To prevent such creeping and also to prevent such damages on the fastening as will gradually weaken the strap and in a critical situation perhaps tear it off completely, the present invention suggests in a strap having a fastening of the type mentioned in the foregoing the arrangement that the part of the strap passed around the slidable bar is at least partly embraced by a cap anchored in the frame and bridging the distance between the slidable bar and the stationary bar on that side of said parts where the strap after embracing the slidable bar passes from said slidable bar into the space between the slidable bar and the stationary bar.

For better elucidation the invention will be described more in detail in the following, reference being had to the accompanying drawing, in which.

Figure 1:
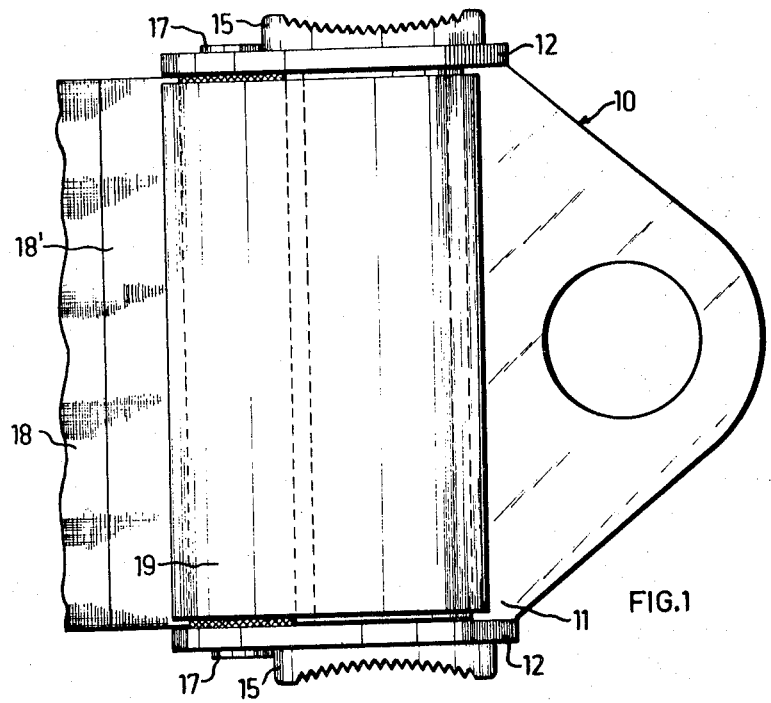
FIG. 1 is a plan view of an anchoring means or fitting with a strap attached therein, showing an embodiment of the arrangement according to the invention.
Figure 2:
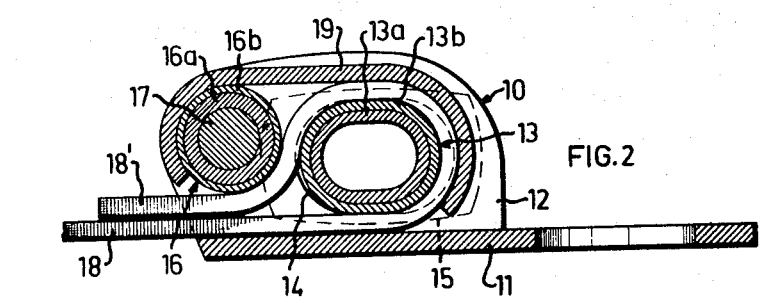
FIG. 2 is a central longitudinal sectional view of the fitting and the strap in FIG. 1.

FIGS. 1 and 2 show an anchoring means or fitting, for example for anchoring a strap of a safety seat belt to the body of a motor car, said safety seat belt including a frame or fitting 10 in the shape of a U-shaped member having a web 11 and arms 12.

A tubular slidable bar 13 of oval cross-sectional form has its end portions mounted in slots 14 in the arms 12 so that it is non-rotatable but displaceable in its transverse direction along the web 11. At the time of mounting, the slidable bar 13 is passed into the slots 14 from one side of the fitting and then prevented from leaving the position bridging the distance between the arms 12 because pins 15 having heads thereon are fitted into the ends of the slidable bar. These pins also serve the purpose of forming means for manipulating the slidable bar 13 in a manner to be described later, and for this purpose the pins may have serrated or knurled end surfaces.

Disposed between the arms 12 is a stationary bar 16 which is cylindrical and non-rotatably mounted on a shaft 17 having its ends attached in said arms 12. The slidable bar 13 is movable towards and away from the bar 16 by being shifted in the slots 14. The slidable bar 13 and the stationary bar 16 both consist of rigid metal cores 13a and 16a, respectively, having knurled cylindrical circumferential surfaces which are coated with surface layers 13b and 16b, respectively, of lead or tin or an alloy of lead and tin, which has been electrolytically precipitated onto said cylindrical circumferential surface of the metal core. An alloy approximately of 60% lead and 40% tin has proved suitable. The surface layer has a thickness of the order of 25 microns (the thickness is heavily exaggerated in the drawing) and as a consequence of the coating having been effected electrolytically said surface layer has the same knurling on the outer side as the cores 13a and 16a, respectively.

A strap 18 is inserted in the fitting 10 between the stationary bar 16 and the web 11 and is passed around the slidable bar 13 and again drawn out of the fitting between the stationary bar 16 and the web 11 after passing between the slidable bar 13 and the bar 16. When a pull is exerted on the strap 18 in a direction away from the fitting 10 the slidable bar 13 is pulled towards the stationary bar 16, sliding in the slots 14, so that the strap is clamped between the knurled surfaces of the slidable bar and the stationary bar in a grip preventing a displacement of the strap. The surface layers 13b and 16b contribute to substantially increasing the friction of the strap 18 against the slidable bar 13 and the stationary bar 16, particularly at a heavy jerky load which may occur in a safety seat belt at the moment of collision. It it is desired to shorten the strap 18, i.e., for adapting the safety seat belt to actual conditions, this may be done by pulling at the free end 18′ of the strap because this will move the slidable bar 13 slightly away from the stationary bar in that the strap is straightened between the upper side of the slidable bar 13 and the underside of the stationary bar 16 so that the clamping action between the slidable bar and the stationary bar is cancelled and the strap 18 can slide freely. This adjustment can be effected with one hand since the only thing to be done is to pull at the strap end 18′. If the strap 18 is to be lengthened this is also easily done with one hand since in that case the thumb and the index finger grasp the heads of the pins 15 in the slidable bar 13, moving this slidable bar away from the stationary bar 16 under displacement in the slots 14 so that the clamping engagement between the slidable bar and the stationary bar is cancelled and the strap 18 can be pulled freely along the fitting 10.

In order that the strap 18 may not unintentionally be displaced in the fitting 10 a resilient cap 19 is provided. The said cap is designed as a yoke of resilient material, for instance plastic material, and has curved arms in order to be able to embrace the slidable bar 13 and the stationary bar 16 and to have its web bridge the distance between the slidable bar and the stationary bar. The cap 19 thus keeps the slidable bar 13 and the stationary bar 16 together but is sufficiently yieldable to allow the manipulations required for adjusting the length of the strap 18 in the manner described above.

When no adjustability is desired the possibility of shifting the slidable bar 13 need not, however, be very great and the cap 19 may be of a considerably stronger construction because in this case it shall be able to yield only an amount sufficient to be able to snap over the slidable bar and the stationary bar, and thereby hold these parts in a relatively firm grip.

Figure 3:
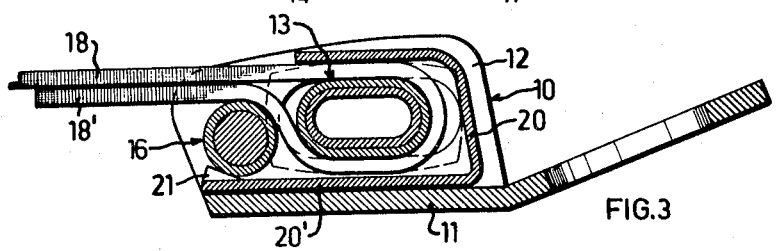
FIG. 3 is a longitudinal sectional view similar to that in FIG. 2 of another embodiment of the arrangement according to the invention.

To the extent the embodiment in FIG. 3 comprises parts which are identical or equivalent with details of the construction according to FIGS. 1 and 2 these details carry the same reference numerals as the corresponding details in FIGS. 1 and 2. The embodiment according to FIG. 3 differs from that in FIGS. 1 and 2 substantially in respect to the design of the cap and the manner in which the strap is inserted in the fitting.

According to FIG. 3 the strap 18 enters the fitting 10 and having passed around the slidable bar 13 it leaves the fitting 10 on the side of the stationary bar 16 which is away from the web 11. The cap, in this instance designated 20, here also is designed as a yoke, for example, of sheet metal, but it is placed in another manner than in FIGS. 1 and 2 inasmuch as it has its arms and web embracing the part of the strap 18 which is passed around the slidable bar 13. One arm of the cap which is designated 20' extends along the web 11 between the latter and the slidable bar 13 and the stationary bar 16. At the free end the corners of the arm 20' are angularly bent at 21 towards the bar 16. These angularly bent portions form projections on the arm 20' which prevent withdrawal of the arm from the position between the stationary bar 16 and the web 11 in a direction towards the slidable bar 13, to the right in FIG. 3, so that the cap 20 is thereby anchored in the fitting 10.

The invention, of course, is not limited to the embodiments described and shown here but can be modified within the scope defined in the appended claims. Above all, the arrangement according to the invention may be employed also in other elements than anchoring means or fittings for safety seat belts, for example in buckles and locking tongues or wherever a strap is secured in an element. A possible modification may be especially mentioned. It consists in that the cap 19 is formed with flaps or lugs which are bent downwardly on the outer side of the arms 12 beyond the ends of the oval slidable bar 13 to hold this slidable bar in position, thereby replacing the pins 15 shown here. At the fixation of the strap it is possible, when no adjustability is needed in the embodiment according to FIGS. 1 and 2, to pass the free strap end back over the slidable bar and the bar and then to snap the cap 19 in position, but at present it is considered preferable for safety reasons to have the free strap end 18' visible outside the fitting, as otherwise one does not know where this strap end is and in a critical situation it may prove that the strap was not properly attached in the element.

In the embodiment according to FIG. 3 a modification could consist in that the arm 20' of the cap 20 grasps the left-hand edge of the web 11 by means of an angularly bent end portion replacing the bent portions 21, so that the cap will thereby be anchored in the fitting 10.

What I claim and desire to secure by Letters Patent is:

1. In combination with a strap, means for fastening said strap comprising a U-shaped frame forming the body of the fastening means, a stationary bar in said frame, a movable bar extending along said stationary bar and being guided without rotation in the frame for movement in its transverse direction towards and away from said stationary bar, said two bars bridging the distance between the arms of the U-shaped frame substantially in parallel with the web of said frame and each having a transversely curved peripheral surface, said strap passed around the movable bar and drawn forth between the bars in order, upon movement of the movable bar towards the stationary bar, to be pressed against said latter bar in an engagement preventing withdrawal of the strap from the fastening means, and a C-shaped cap forming one arm partly embracing the portion of the strap passed around the movable bar and closely following the curved shape thereof, another arm partly embracing the stationary bar and closely following the curved shape thereof, and a substantially planar web interconnecting said arms and bridging the distance between the bars on the side thereof which is opposed to the web of the U-shaped frame thereby holding the bars together, the web of said cap being substantially parallel to the web of the frame, the strap extending into the fastening means, and after embracing the movable bar and passing between the bars again extending from the fastening means between the stationary bar and the web of the frame.

2. The combination as claimed in claim 1 in which each of said bars consists of a rigid metal core and a surface layer electrolytically precipitated onto said metal core of a metal in the group comprising lead and tin.

3. The combination as claimed in claim 1 in which each of said bars consists of a rigid metal core and a surface layer electrolytically precipitated onto said metal core of an alloy substantially consisting of a metal in the group comprising lead and tin.

4. The combination as claimed in claim 3 in which said alloy contains approximately 60% lead and 40% tin.

5. The combination as claimed in claim 2 in which said layer has a thickness of the order of 25 microns.

References Cited by the Examiner

UNITED STATES PATENTS

| | | | |
|---|---|---|---|
| 495,633 | 4/1893 | Hoyt | 24—196 |
| 1,233,932 | 7/1917 | Swafford | 24—197 |
| 1,738,900 | 12/1929 | Henry | 24—74 |
| 2,743,497 | 5/1956 | Davis | 24—196 |

FOREIGN PATENTS 761,891   11/1956   Great Britain.

WILLIAM FELDMAN, *Primary Examiner.*

M. HENSON WOOD, JR., *Examiner.*